US006468727B2

(12) United States Patent
Pitt et al.

(10) Patent No.: US 6,468,727 B2
(45) Date of Patent: Oct. 22, 2002

(54) NONIONIC OLIGOMERIC SURFACTANTS AND THEIR USE AS DISPERSANTS AND STABILIZERS

(75) Inventors: Alan R. Pitt, Sandridge (GB); Trevor J. Wear, South Harrow (GB); Danuta Gibson, Garston (GB); Ian M. Newington, Hazelmere (GB); Mary C. Brick, Webster, NY (US); John W. Boettcher, Webster, NY (US); Gary N. Barber, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/770,129

(22) Filed: Jan. 26, 2001

(65) Prior Publication Data

US 2001/0034385 A1 Oct. 25, 2001

(30) Foreign Application Priority Data

Feb. 5, 2000 (GB) .............................................. 0002626

(51) Int. Cl.$^7$ ............................ G03C 1/08; G03C 7/26; G03C 7/32
(52) U.S. Cl. ....................................... 430/546; 430/631
(58) Field of Search ................................. 430/546, 631

(56) References Cited

U.S. PATENT DOCUMENTS

| 3,658,546 | A | * | 4/1972 | Van Doorseaer et al. ... 430/631 |
|---|---|---|---|---|
| 4,022,622 | A | * | 5/1977 | Timmerman et al. ....... 430/631 |
| 4,259,231 | A | | 3/1981 | Tomomoto et al. |
| 4,277,581 | A | | 7/1981 | Vanlerberghe et al. |
| 4,282,343 | A | | 8/1981 | Platt, Jr. |
| 4,328,141 | A | | 5/1982 | Farewell et al. |
| 4,447,493 | A | | 5/1984 | Driscoll et al. |
| 4,587,313 | A | | 5/1986 | Ohta et al. |
| 4,677,157 | A | | 6/1987 | Jacobs |
| 4,777,276 | A | | 10/1988 | Rasmussen et al. |
| 4,837,290 | A | | 6/1989 | Rasmussen et al. |

(List continued on next page.)

OTHER PUBLICATIONS

JP Abstract 57/201595; published Dec. 10, 1982; Mitsubishi Chem Ind Ltd; Kamata Osamu et al; "Scale Preventing Agent For Circulating Cooling Water System".

JP Abstract 59/18775; published Jan. 31, 1984; Hitachi Chem Co Ltd; Oota Tomohisa et al; "Radiation–Curable Pressure–Sensitive Adhesive Composition".

JP Abstract 60/53583; published Mar. 27, 1985; Nitto Electric Ind Co Ltd; Moroishi Yutaka et al; "Elastic Sealant".

*Primary Examiner*—Geraldine Letscher
(74) *Attorney, Agent, or Firm*—Andrew J. Anderson

(57) ABSTRACT

A hydrophobically capped oligomeric acrylamide or pyrrolidone is employed as a dispersant for hydrophobic materials in an aqueous medium containing a hydrophilic colloid, e.g. gelatin. The hydrophobic materials include photographic addenda such as color couplers or solid particle dyes. Preferred dispersants have the general formula $$R-L-T \qquad (1)$$

or $$R^1-L-T \atop R^2 \qquad (2)$$

in which
R, $R^1$ and $R^2$ are each independently selected from aliphatic hydrocarbyl, aryl-(aliphatic hydrocarbyl) and (aliphatic hydrocarbyl)-aryl groups,
L is a sulphur atom or a linking group that contains a sulphur atom attached to the T group, and
T is a hydrophilic oligomeric group obtained by the oligomerisation of one or more vinyl monomers having an amido function.

12 Claims, 1 Drawing Sheet

U.S. PATENT DOCUMENTS

| | | |
|---|---|---|
| 4,914,165 A | 4/1990 | Klun et al. |
| 4,914,223 A | 4/1990 | Rasmussen et al. |
| 4,996,243 A | 2/1991 | Rasmussen et al. |
| 5,082,914 A | 1/1992 | Cook et al. |
| 5,216,097 A | 6/1993 | Allewaert et al. |
| 5,219,705 A | 6/1993 | Kato et al. |
| 5,232,813 A | 8/1993 | Okuno et al. |
| 5,252,395 A | 10/1993 | Maruoka et al. |
| 5,252,697 A | 10/1993 | Jacobs et al. |
| 5,292,514 A | 3/1994 | Capecchi et al. |
| 5,292,796 A | 3/1994 | Dams et al. |
| 5,352,712 A | 10/1994 | Shustack |
| 5,368,931 A | 11/1994 | Kato et al. |
| 5,444,110 A | 8/1995 | Kitazawa et al. |
| 5,478,893 A | 12/1995 | Ghosh et al. |
| 5,561,025 A | 10/1996 | Torres et al. |
| 5,585,035 A | 12/1996 | Nerad et al. |
| 5,639,846 A | 6/1997 | Shustack |
| 5,728,749 A | 3/1998 | Vanhoye et al. |
| 5,736,624 A | 4/1998 | Bieniarz et al. |
| 5,744,302 A | 4/1998 | Sessler et al. |
| 6,127,453 A * | 12/2000 | Erdtmann et al. .......... 523/160 |

* cited by examiner

NONIONIC OLIGOMERIC SURFACTANTS AND THEIR USE AS DISPERSANTS AND STABILISERS

FIELD OF THE INVENTION

The present invention relates to certain nonionic oligomeric surfactants, in particular such surfactants based on vinyl systems having an amido function, especially acrylamide, methacrylamide or a derivative thereof, and to the use thereof as dispersants and/or stabilisers for hydrophobic materials, especially hydrophobic addenda that are utilised in the manufacture of photographic products.

BACKGROUND OF THE INVENTION

Micro-precipitated dispersions of photographic couplers, prepared by solvent and/or pH shift techniques are becoming more widely used (see references: UK Pat. No. 1,193,349 by J. A. Townsley & R. Trunley; Research Disclosure 16468, December 1977, pp 75–80 by W. J. Priest; U.S. Pat No. 4,957,857 by K. Chari; U.S. Pat. Nos. 4,970,139 and 5,089,380 by P. Bagchi; U.S. Pat No. 5,008,179 by K. Chari, W. A. Bowman and B. Thomas; U.S. Pat. No. 5,104,776 by P. Bagchi and S. J. Sargeant) and offer benefits in decreased droplet size and often increased reactivity relative to conventional oil-in-water homogenised dispersions. European Patent Publication 0,674,221A (Application No. 95200377.0) (Kodak Ltd.) teaches that increased coupler reactivity leads to higher maximum densities (Dmax) with these dispersions. However, it would be desirable to lower the viscosity of such dispersions, relative to the viscosity obtained with conventional anionic dispersants, and to avoid the problem of flocculation that is usually encountered in gelatin solutions when using typical nonionic dispersants.

Dispersions of solid particle dyes are typically obtained by milling the powdered dye in a ball mill with a dispersant and stabiliser for periods of days. During this time the dyes characteristically mill down to a mean particle size of 50 to 200 nm. The stability of dispersions is habitually tested by subjecting the systems to an accelerated keeping test. This is commonly engineered by holding the systems at an elevated temperature for long periods of time and monitoring processes such as particle growth or flocculation. Typically, solid particle dyes require both a dispersant and stabiliser to form a stable dispersion. Clearly, it would be an advantage if a dispersant could be used that also acted as a stabiliser.

Solid particle cationic sensitising dye dispersions are typically obtained by milling the powdered dye in a ball mill with a dispersant and stabiliser for long periods in a similar manner to the filter dyes. Perhaps owing to their cationic nature, the dyes do not mill well with anionic dispersants or nonionic/ anionic copolymer dispersants, the systems tending to thicken or set up. However, and perhaps more surprising, they do not mill very well with nonionic oligomeric or polymeric dispersants either, the systems still tending to exhibit high viscosity or setting up. Plainly, it would be advantageous to use a dispersant that permitted milling with less thickening or setting up.

SUMMARY OF THE INVENTION

The invention, in one aspect, provides hydrophobically capped oligomeric acrylamides and pyrrolidones, in particular the compounds of the general formula $$R-L-T \quad (1)$$

or $$R^1-L-T \atop R^2 \quad (2)$$

in which

R, $R^1$ and $R^2$ are each independently selected from aliphatic hydrocarbyl, aryl-(aliphatic hydrocarbyl) and (aliphatic hydrocarbyl)-aryl groups, L is a sulphur atom or a linking group that contains a sulphur atom that is attached to the T group, and T is a hydrophilic oligomeric group obtained by the oligomerisation of one or more vinyl monomers having an amido function.

The present invention also provides, in another aspect thereof, a composition that comprises an aqueous medium containing a hydrophilic colloid, a hydrophobic material dispersed in the medium and a dispersant, wherein the said dispersant is a compound of the present invention as defined above.

The present invention, in yet another aspect, provides a method for making a composition according to this invention, which method comprises dispersing a hydrophobic material in an aqueous medium that is liquid and that contains a hydrophilic colloid, wherein the dispersing is carried out in the presence of a compound of the present invention as defined above.

The present invention further provides a process for producing a photographic material, which process comprises applying to a support a plurality of aqueous layers each of which contains a hydrophilic colloid, wherein at least one such layer comprises a composition of the present invention. Also provided are photographic materials obtainable by this process.

The present invention, in yet a further aspect thereof, provides the use of a compound of the present invention, as defined above, as a dispersant for a hydrophobic material in an aqueous medium that contains a hydrophilic colloid.

BRIEF DESCRIPTION OF THE DRAWINGS

The FIGURE is a schematic diagram of the milling region of a micro media mill.

DESCRIPTION OF EXEMPLARY EMBODIMENTS

Figure 1:
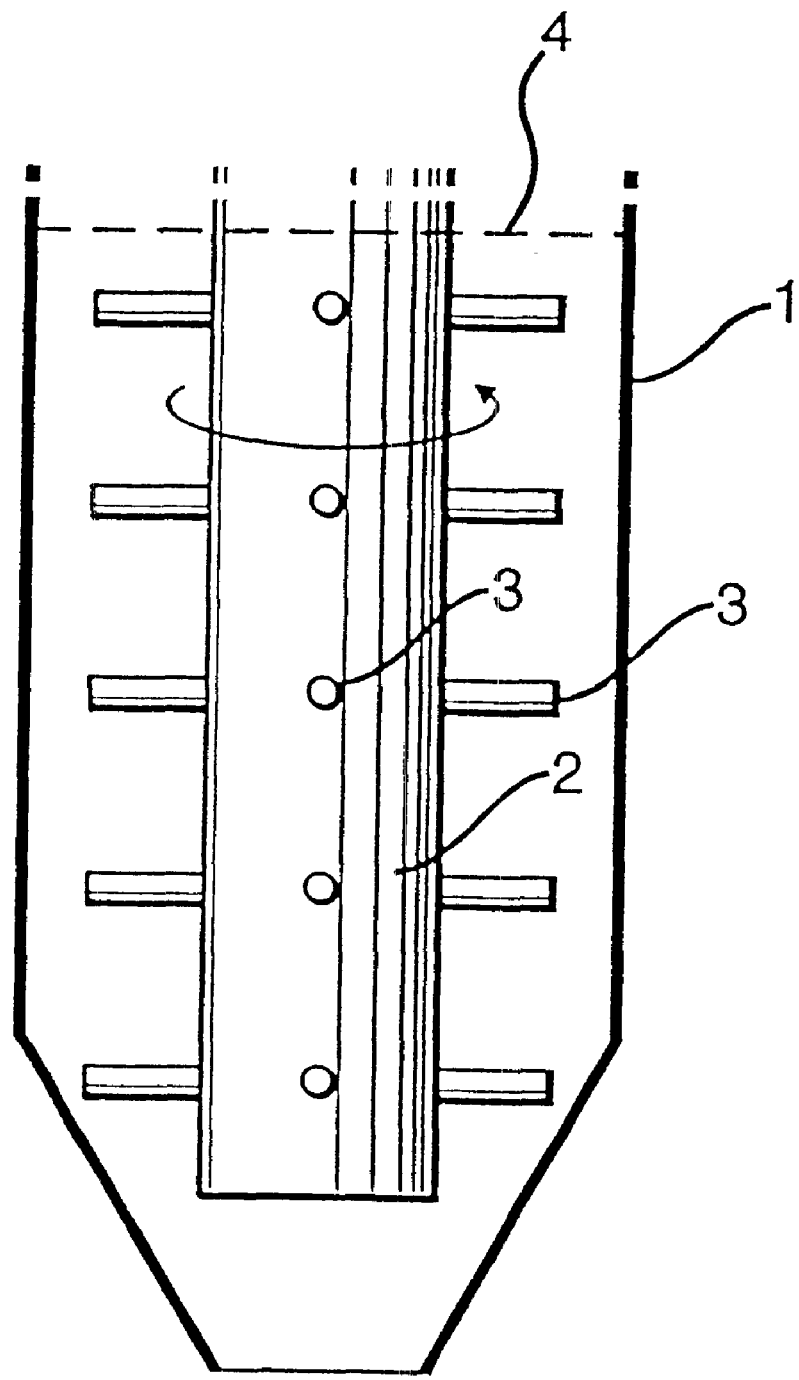

The preferred compounds of the present invention are defined by either of the following formulae:

$$R-L-T \quad (1)$$

or $$R^1-L-T \atop R^2 \quad (2)$$

The number of hydrophobic groups, R or ($R^1$+$R^2$), depends on the linking group L. The hydrophobic group or groups each comprise an aliphatic hydrocarbyl, aryl-(aliphatic hydrocarbyl) or (aliphatic hydrocarbyl)-aryl group, wherein, in each case, the aliphatic hydrocarbyl group may be saturated or unsaturated and may be straight or branched. Preferred aliphatic hydrocarbyl groups are alkyl and alkenyl groups and preferred aryl moieties are phenyl and naphthyl groups. Typically, each of the groups R, $R^1$ and $R^2$ contains from 8 to 21 carbon atoms. $R^1$ and $R^2$ may be the same or different.

The linking entity L is either a sulphur atom (—S—) or a linking group that contains a sulphur atom through which it is attached to T, in other words a linking group that is linked to the or each hydrophobic group by a simple chemical bond and to the oligomeric moiety T by a thio-link (—S—).

Certain preferred sub-groups of the present compounds are represented by the following general formulae, in which formulae (3), (4) and (5) contain typical linking groups for compounds with one hydrophobic group and formulae (6), (7) and (8) contain typical linking groups for compounds with two hydrophobic groups:

  (3)

  (4)

  (5)

  (6)

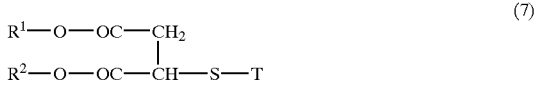  (7)

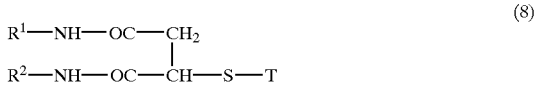  (8)

In the above formulae (4), (5), (7) and (8), other simple chemical groups, in place of the ester or amide link, may also come into consideration.

The oligomeric group T is preferably based on the oligomerisation of vinyl monomers with an amido function, the vinyl part providing a route to oligomerisation and the amido part providing a nonionic polar group to constitute the hydrophilic functional group (after oligomerisation). The oligomeric group T can be constituted from a single monomer source or a mixture of two or more monomers, provided that the resultant oligomeric chain is sufficiently hydrophilic to render the resulting surface-active material soluble or dispersible in water or other medium. A mixture of monomers may give rise to a group T that is a random co-oligomer. Preferred monomers used to make the oligomeric chain T are acrylamide, derivatives of acrylamide, methacrylamide and derivatives methacrylamide. The monomer 2-vinylpyrrolidone may also be used, although it is less favoured owing to the possibility of adverse photographic effects sometimes found with polyvinyl pyrrolidone (PVP) materials.

Certain suitable monomers can be represented by the two general formulae

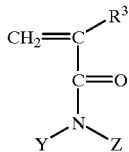  (9)

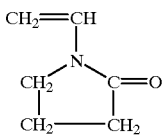  (10)

wherein formula (9) represents acrylamide, methacrylamide or a derivative of either of these, and formula (10) represents 2-vinylpyrrolidone. In formula (9), $R^3$ is H or a $C_1$, $C_2$ or $C_3$ alkyl group, preferably H or $CH_3$ (which leads to an acrylamide or methacrylamide-based monomer, respectively) and Y and Z, which may be the same or different, are each H, $C_1$–$C_3$ alkyl or $C_1$–$C_4$ alkyl substituted with one or more hydroxyl groups, preferably H, $CH_3$, $C_2H_5$ or $C(CH_2OH)_3$. Alternatively, Y and Z, together with the N atom to which they are shown attached, may form a heterocyclic ring, in particular a 5- or 6- membered ring, e.g. a pyrrolidinyl or piperidinyl ring.

In certain preferred embodiments, the compounds of the formulae (1) and (2) have an oligomeric group (T) that contains from 2 to 100, more preferably from 3 to 50, and typically from 5 to 40, monomeric units. The degree of oligomerisation is generally selected so as to provide sufficient hydrophilicity to render the resulting compound soluble or self-dispersible in the aqueous medium.

The hydrophobically capped oligomeric acrylamide or pyrrolidone dispersants useful in the present invention may be prepared by processes similar to those described in the preparative Examples hereinafter and in Pavia et al, Makromol. Chem. (1992), 193(9), 2505–2517.

As stated above, the compounds of the present invention may be used as dispersants, and may be used, for example, as dispersants for hydrophobic addenda that are utilised in the manufacture of photographic products. Such addenda include, for instance, colour couplers, together with their associated solvents (if any), or solid particle dyes. The solid particle dyes have various uses, but typical applications are as filter dyes for anti-halation layers and as sensitising dyes for silver halide photographic emulsions. Such hydrophobic addenda and suitable solvents (where applicable) are described in Research Disclosure, December 1989, Item 308119, published by Kenneth Mason Publications, Ltd., United Kingdom, in U.S. Pat. No. 5,484,695 (Pitt et al) and in the patent literature cited in that US Patent, the disclosure in all of which publications is incorporated herein by reference.

Compositions comprising a hydrophilic colloid having hydrophobic particles dispersed therein may be formed by a process comprising dispersing a hydrophobic material into an aqueous solution of a hydrophilic colloid in the presence of a dispersant according to the present invention. Since the hydrophobic material constituting the dispersed or discontinuous phase need not necessarily be solid, but could in certain cases be semi-solid, semi-liquid or liquid, it should be understood that the expression "hydrophobic particles" includes not only solid particles but also, for example, droplets or globules. It may be mentioned here that the expression "hydrophobic material" is not limited herein to hydrophobic photographic addenda but includes, for example, other materials that do not dissolve or self-disperse in water.

The preferred hydrophilic colloid is gelatin. However, other hydrophilic colloids come into consideration, for example proteins such as gelatin derivatives, graft polymers of gelatin and other polymers, albumin or casein; saccharides such as cellulose derivatives, for example hydroxyethyl cellulose or cellulose sulphate, sodium alginate and starch derivatives; and various synthetic hydrophilic high-molecular weight substances, including homopolymers or copolymers, for example polyvinyl alcohol, polyvinyl alcohol semiacetal, poly-N-vinylpyrrolidone, polyacrylic acid, polymethacrylic acid, polyacrylamide, polyvinyl imidazole and polyvinyl pyrazole.

According to certain preferred embodiments, a multilayer photographic material comprises a support bearing a plurality of hydrophilic colloid layers including at least one light-sensitive silver halide emulsion layer wherein at least one of the layers of the photographic material contains a hydrophobic material dispersed therein with the aid of a dispersant according to the present invention. Such a photographic material may be produced in a manner analogous to that described in the above-mentioned U.S. Pat. No. 5,484,695. It is generally preferred to coat the aqueous hydrophilic colloid layers onto the support simultaneously. After coating, the colloid layers are generally dried; normally the drying is preceded by the chill setting of the coated layers. Procedures for the coating and drying of hydrophilic colloid layers are described in Research Disclosure, Item 17643, December 1978, the teaching in which is incorporated herein by reference.

It may also be mentioned that the use of the dispersants according to the present invention is not restricted to underlying layers. Inclusion of such a dispersant in the topmost or outermost layer may also be appropriate, for example if that layer contains a dispersed lubricant or a dispersed UV-protection agent.

The concentration of the dispersant may vary according to the system with which it is used. With micro-precipitated dispersions the concentration of the dispersant is usually 0.1× to 8×, preferably 0.25× to 2× and more preferably 0.5× to 1×, with respect to the coupler on a molar basis. With evaporated dispersions, the concentration of dispersant is usually 0.02× to 2×, preferably 0.03× to 0.5× and more preferably 0.05× to 0.2× with respect to the coupler on a molar basis. With solid particle filter dyes or solid particle sensitising dyes, such dyes are typically used in the milling operation at a concentration of about 10% by weight in an aqueous slurry, the concentration of the dispersant being usually 2% to 20%, preferably 4% to 15% and more preferably 5% to 10%, by weight of the total slurry.

The compounds of the present invention offer several advantages over the dispersants used in current practice. The advantages arise from the effect of the dispersants on the physical properties of the dispersion, and certain advantages may be somewhat system specific.

In the case of colour couplers, the compounds of this invention have been found to give the dispersed system a higher coupler reactivity and a lower low-shear viscosity. The higher reactivity makes the colour couplers more efficient and hence less coupler may be needed. The lower low-shear viscosity permits the colour couplers to be used at higher concentrations. Coating at higher concentrations means coating with less water, which leads to savings in energy and the potential for increasing coating speeds where systems are dryer-limited (i.e. wherein the coating speed is limited by the drying capacity). Furthermore, the lower the low-shear viscosity of a colour coupler dispersion system, the less likely is it that it will exhibit severe shear-thinning behaviour. Severe shear-thinning behaviour can be detrimental to coating uniformity owing to the resulting non-uniform flow of coating melts through the geometry of the equipment used for solution delivery. Hence, benefits in coating uniformity are attainable. High low-shear viscosity also makes the solution management of the dispersed systems very difficult under low-shear conditions, which may be met during pouring, mixing and pumping. Accordingly, the low-viscosity feature provided by the compounds of this invention facilitate solution management of the dispersions with which they are associated. Although the applicant does not wish to be bound by theory, it is understood that the low-viscosity feature is due to the absence of strong ionic interactions between gelatin, which is commonly utilised in photographic coating media, and the compounds of the invention; however, there is sufficient interaction between the two, such that the associated disperse systems do not flocculate when added to an aqueous gelatin solution. This enables the non-ionic dispersants of the present invention to be used as the sole dispersant in an aqueous gelatin system. In contrast, conventional non-ionic dispersants, which are based on poly(ethylene oxide) or sugar hydrophilic groups, typically cannot be used as the sole dispersant in photographic systems owing to the proneness of the corresponding dispersion to flocculate in the presence of gelatin in solution.

In the case of solid particle dyes, a significant advantage of the compounds of the present invention resides in the ability to use one material in place of two. The current practice is to add both a dispersant and a stabiliser to the system being dispersed, the former facilitating the dispersion of the system and the latter stabilising the dispersed system against flocculation and particle ripening. The materials of this invention can fulfill both the role of dispersant and the role of stabiliser. One of the common stabilisers in current use, polyvinyl pyrrolidone (PVP), is often associated with adverse photographic effects, in particular losses of photographic speed, contrast and maximum density. The compounds of the present invention based on acrylamide or the like offer the advantage that they do not exhibit these adverse photographic effects.

The use of the present compounds are dispersants and stabilisers is further described hereinafter, with reference to illustrative examples thereof.

The present invention is illustrated in and by the following Examples.

PREPARATIVE EXAMPLES

Examples of the synthesis of the oligomeric surfactants of the invention are described below. The method for oligomerisation was adapted from the preparation described by Pavia et al in Makromoleculare Chemie, (1992) 193(9), 2505–17.

Example 1

Synthesis of Dodecyltiopolyacrylamide (Formula (3), R=n-$C_{12}H_{25}$, X=Y=Z=H, average 10 monomer units)

Acrylamide (35.50 g, 0.50 moles) and 1-dodecanethiol (10.10 g, 0.050 moles) were suspended in ethanol (250 ml) under a nitrogen atmosphere in a 1 L three-necked round-bottomed flask equipped with a reflux condenser. The solution was stirred and degassed with nitrogen for 20 minutes. Stirring was continued and the temperature raised to 70° C. over a period of 20 minutes during which time the reagents dissolved. 2,2'-Azo-bis(2-methylpropionitrile)[AIBN] (1.00 g, 6.10 mmoles) was added to the stirred solution at 70° C. and heating continued for 4 hours under the control of an automated reactor system. During this time a white suspension formed. After cooling, the resulting white precipitate was filtered under suction and dried in vacuo to give a white powder (39.6 g, 87%). Analysis of this product was consistent with the desired oligomeric acrylamide.

Example 2

Synthesis of Oligomer (Formula (4), R=n-$C_{12}H_{25}$, X=Y=Z=H, average 10 monomer units)

1-Dodecanol (130.5 g, 0.651 mol) and mercaptoacetic acid (60.00 g, 0.651 mol) were refluxed for 2 hours under an argon atmosphere in toluene (400 ml) in the presence of p-toluene-sulphonic acid hydrate (1.00 g) in a flask equipped with a Dean & Stark trap. During this time approximately 7.5 ml of water collected in the side arm of the trap. Toluene was removed under reduced pressure and the crude product re-dissolved in ethyl acetate (900 ml). The solution was washed with saturated aqueous sodium hydrogen carbonate (2×600 ml) and the organic layer dried over anhydrous magnesium sulphate, filtered and evaporated under reduced pressure to give a clear oil (170.6 g, 100%). Analysis was consistent with the desired dodecylmercaptoacetate.

Dodecylmercaptoacetate (52.10 g, 0.20 mol), acrylamide (142.20 g, 2.00 mol) and AIBN (0.52 g) were stirred together in a 2 L three-necked flask equipped with a reflux condenser. Argon was bubbled through the mixture for 20 minutes to degas the solvent and the mixture refluxed under an argon atmosphere for 17 hours. The acrylamide dissolved as the temperature reached reflux temperature and after approximately 30 minutes a white solid product began to appear. The mixture was cooled then filtered under suction and dried to give a white solid (118.5 g, 61%). Analysis was consistent with the desired oligomeric acrylamide.

Example 3

Synthesis of Oligomer (Formula (5), R=(Z)-9-Octadecenyl, X=Y=Z=H, average 10 monomer units)

Oleylamine (technical grade 80%, 99.10 g, 0.37 mol) and methyl thioglycolate (39.33 g, 0.37 mol) were heated together at 155° C. under an argon atmosphere in a flask equipped with a Dean & Stark trap and a condenser for 17 hours. During this time methanol collected in the trap (about 15 ml, about 11.9 g, 0.37 mol). The resulting yellow liquid solidified on cooling to give a pale yellow solid (123.4 g, 97%). Analysis was consistent with N-oleyl-2-mercaptoacetamide.

N-oleyl-2-mercaptoacetamide (34.16 g, 0.10 mol), acrylamide (71.10 g, 1.00 mol) and AIBN (0.37 g) were stirred together in methanol (500 ml) in a 1 L three-necked round-bottomed flask equipped with a reflux condenser. Argon gas was bubbled through the solution for 20 minutes to degas the solvent. The mixture was then refluxed for 5 hours under an argon atmosphere. As reflux was achieved the solids dissolved. After approximately 20 minutes an off-white solid began to form. On cooling, the resulting solid was filtered under suction and dried in vacuo to give a white solid (85.2 g, 78%).

Example 4

Synthesis of Oligomer (Formula (7), $R^1=R^2$=2-ethylhexyl, X=H, Y=Z=$CH_3$ average 15 monomer units)

Mercaptosuccinic acid (15.10 g, 0.10 moles) and 2-ethyl-1-hexanol (26.30 g, 0.20 moles) were suspended in toluene (200 ml) in a 500 ml round-bottomed flask. Toluene sulphonic acid hydrate (0.10 g) was added as catalyst and the flask set up for reflux with a Dean & Stark trap. The components went into solution as the mixture was warmed and the whole was refluxed under an argon atmosphere for 18 hours. The reaction mixture was concentrated by evaporation under reduced pressure then redissolved in ethyl acetate (500 ml) and washed sequentially with saturated aqueous sodium hydrogen carbonate (300 ml) and water (300 ml). The organic layer was separated, dried over anhydrous magnesium sulphate, filtered and evaporated to give a pale yellow oil (31.1 g, 83%). Analysis was consistent with di-(2-ethyl- 1-hexyl)mercaptosuccinate.

Di-(2-ethyl-1-hexyl)mercaptosuccinate (24.60 g, 0.066 moles) and N,N-dimethylacrylamide (97.65 g, 0.985 moles) were dissolved in methanol (260 ml) in a three necked 500 ml flask. The solution was stirred and degassed by bubbling argon through the solution for 20 minutes. AIBN (0.70 g) was added and the solution heated to reflux for 17 hours under argon atmosphere. The methanolic solution was diluted with methanol and then washed with heptane. The methanol layer was re-evaporated to give a deep yellow/brown viscous oil which solidified on cooling (123.0 g, 100%). The desired product confirmed by MS (mass spectrometry).

Example 5

The preparation of other oligomeric species of the present invention was performed using procedures similar to those described above. If no precipitate formed the alcoholic solution was washed with heptane to remove excessively hydrophobic by-products, as described in Example 4.

Exemplary compounds of the present invention are disclosed in the following Table A. In that Table, the compounds are allocated respective compound numbers, which numbers are used to identify the compounds in the Tables relating to the Test Examples hereinafter.

TABLE A

Exemplary compounds of the invention, in which T is a (meth)acrylamide group of the formula (9)

| Compound No. | Formula | R | $R^1$ | $R^2$ | $R^3$ | Y | Z | Average No. of Monomer Units |
|---|---|---|---|---|---|---|---|---|
| 1 | (3) | n-$C_{12}H_{25}$ | — | — | H | H | H | 5 |
| 2 | (3) | n-$C_{12}H_{25}$ | — | — | H | H | H | 10 |
| 3 | (3) | n-$C_{12}H_{25}$ | — | — | H | H | H | 15 |
| 4 | (3) | n-$C_{12}H_{25}$ | — | — | H | H | H | 20 |
| 5 | (3) | n-$C_{12}H_{25}$ | — | — | H | H | H | 30 |
| 6 | (3) | n-$C_{14}H_{29}$ | — | — | H | H | H | 15 |
| 7 | (3) | n-$C_{14}H_{29}$ | — | — | H | H | H | 21 |
| 8 | (3) | n-$C_{18}H_{37}$ | — | — | H | H | H | 40 |

TABLE A-continued

Exemplary compounds of the invention, in which T is a (meth)acrylamide group of the formula (9)

| Compound No. | Formula | R | $R^1$ | $R^2$ | $R^3$ | Y | Z | Average No. of Monomer Units |
|---|---|---|---|---|---|---|---|---|
| 9 | (3) | n-$C_{10}H_{21}$ | — | — | H | H | H | 10 |
| 10 | (3) | n-$C_{10}H_{21}$ | — | — | H | H | H | 15 |
| 11 | (3) | n-$C_{10}H_{21}$ | — | — | H | H | H | 20 |
| 12 | (3) | n-$C_8H_{17}$ | — | — | H | H | H | 10 |
| 13 | (3) | n-$C_{12}H_{25}$ | — | — | H | $CH_3$ | $CH_3$ | 5 |
| 14 | (3) | n-$C_{12}H_{25}$ | — | — | H | $CH_3$ | $CH_3$ | 10 |
| 15 | (3) | n-$C_{12}H_{25}$ | — | — | $CH_3$ | H | H | 10 |
| 16 | (3) | n-$C_{12}H_{25}$ | — | — | $CH_3$ | H | $CH_3$ | 10 |
| 17 | (3) | n-$C_{16}H_{33}$ | — | — | H | H | $C(CH_2OH)_3$ | 15 |
| 18 | (7) | — | n-$C_8H_{17}$ | n-$C_8H_{17}$ | H | H | H | 15 |
| 19 | (7) | — | 2-ethylhexyl | 2-ethylhexyl | H | $CH_3$ | $CH_3$ | 10 |
| 20 | (7) | — | 2-ethylhexyl | 2-ethylhexyl | H | H | H | 10 |
| 21 | (7) | — | 3-phenylpropyl | 3-phenylpropyl | H | H | H | 15 |
| 22 | (7) | — | 3-phenyl-2,2-dimethylpropyl | 3-phenyl-2,2-dimethylpropyl | H | H | H | 10 |
| 23 | (7) | — | 2-ethylhexyl | 2-ethylhexyl | H | $CH_3$ | $CH_3$ | 15 |
| 24 | (7) | — | 3-phenyl-2,2-dimethylpropyl | 3-phenyl-2,2-dimethylpropyl | H | $CH_3$ | $CH_3$ | 7 |
| 25 | (7) | — | 3,7-dimethyl-octyl | 3,7-dimethyl-octyl | H | H | H | 15 |
| 26 | (7) | — | 3,7-dimethyl-octyl | 3,7-dimethyl-octyl | H | $CH_3$ | $CH_3$ | 15 |

Test Examples

The advantages of the present compounds as dispersants and stabilisers are illustrated in the Test Examples that follow.

There are some common advantages between different disperse systems made using the dispersants of this invention, such as the ability to prepare low viscosity dispersions, and the ability to use one nonionic as the sole dispersant with the avoidance of flocculation and particle growth, particularly in the presence of aqueous gelatin. However, different additional advantages are found in the different systems owing to the different function of each system. For this reason, each type of disperse system is considered separately. For colour coupler systems, two types are examined as examples- these are micro-precipitated dispersions and evaporated dispersions. For the solid particle dye systems, two types are examined as examples; these are filter dyes for anti-halation layers and sensitising dyes for silver halide photographic emulsions. Conventional dispersants used for comparison purposes are recorded in Table B below. In this table, the dispersants are each allocated a reference letter or code which is used to identify the dispersant in the tables of results pertaining to the Test Examples.

TABLE B

Conventional Dispersants

| Reference letter(s) | Dispersant |
|---|---|
| SDS | Sodium dodecyl sulphate |
| SDS-A | Sodium dodecyl sulphate (Eastman) |
| PVP | Polyvinyl pyrrolidone |
| PVP-A | Luviskol K30 (PVP) |
| A | Texofor T170 ($C_{13}H_{27}(EO)_{17}$ wherein EO = ethylene oxide) |
| B | Synfac 8216 |
| C | Dapral GE-202 (Polymeric dispersant containing polyethyleneoxide, alkyl and COOH groups) |
| D | Tetronix 908 (BASF: polypropyleneoxide-polyethyleneoxide nonionic block copolymer) |
| E | Pluronic L44 (BASF: polypropyleneoxide-polyethyleneoxide nonionic block copolymer) |
| F | Monawet MO-70E (Mona Industries: di-2-ethylhexyl sulphosuccinate, sodium salt) |
| G | Di-3-phenyl-2,2-dimethylpropyl sulphosuccinate, sodium salt (US-A-5,763,150) |
| H | Dowfax 2A1 (Dow Chemical Co.: dodecylated oxydibenzene disulphonate) |
| I | Stephan Polystep A15 (Stephan: sodium dodecyl benzene sulphonate) |
| J | Alkanol XC (Dupont: isopropylated naphthalene sulphonate, sodium salt) |
| K | Triton X-200 (Union Carbide: octylphenyl ether sulphonate, sodium salt-nonionic/anionic) |
| L | T-DET n-30 (Harcros: nonylphenyl ethoxylate-30 moles) |
| M | Glucopon 225CS (Henkel: octyl/decyl polyglucoside; 1–4 glucoside units) |
| N | Glucoside APG 225 (Henkel: octyl/decyl polyglucoside; 1–4 glucoside units) |
| O | Glucoside APG 325 (Henkel: octyl/decyl/undecyl polyglucoside; 1–4 glucoside units) |
| P | Triton X-165 (Union Carbide: octyl phenol ethoxylate, HLB 15.8) |
| Q | Triton X-405 (Union Carbide: octyl phenol ethoxylate, HLB 17.9) |
| R | Triton 770 (Union Carbide: alkylaryl ether sulphate) |
| S | Brij 58 (ICI: cetyl ethoxylate, HLB 15.7) |
| T | Trycol LAL-23 (Henkel: dodecyl ethoxylate-23 moles) |
| U | Polyvinylpyrrolidone (Aldrich: Mol. Wt = 10K) |
| V | Polyvinylpyrrolidone (Eastman: Mol. Wt. = 40K) |
| W | Polyvinylalcohol (Eastman #2606: Mol. Wt. = 93K) |
| X | Cyanomer N-100L (American Cyanamide: polyacrylamide Mol. Wt. = 1.5K) |

TABLE B-continued

Conventional Dispersants

| Reference letter(s) | Dispersant |
| --- | --- |
| Y | Cyanomer N-10 (American Cyanamide: polyacrylamide Mol. Wt. = 10K) |
| Z | Cyanomer P-21 (American Cyanamide: polyacrylamide/polyacrylic acid copolymer MW. 200K) |

Example 6

Micro-precipitated Dispersions

When microprecipitated dispersions are prepared using the compounds of this invention, the benefits obtainable with conventional micro-precipitated dispersions are increased and additional benefits are found. The additional benefits depend on the type of dispersant the compounds of the invention are being compared with. Relative to systems produced using anionic dispersants, the systems produced using the compounds of the invention show much reduced viscosity. Relative to systems produced using typical non-ionic dispersants, the compounds of the present invention lead to increased compatibility with gelatin and the avoidance of flocculation problems usually encountered in aqueous gelatin solution.

Comparison of Dispersants

Micro-precipitated dispersions were made with cyan coupler C-1 and yellow coupler C-2 (structures shown below) and various dispersing aids according to the methods following this section. Coupler reactivity was measured by a "liquid dispersion reactivity" method described by Bagchi in U.S. Pat Nos.: 4,970,139; 5,089,380 and 5,104,776. Particle size was measured by photon correlation spectroscopy. The viscosities of the resultant dispersions were measured by controlled stress rheometers (dispersions of Coupler C-1 with a Bohlin CS50 rheometer and dispersions of Coupler C-2 with a Carrimed rheometer). The objective of the study was to compare the performance of some of the materials of this invention as a dispersing aid against other surfactants.

Coupler C-1

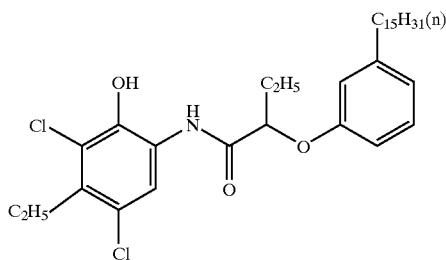

Coupler C-2

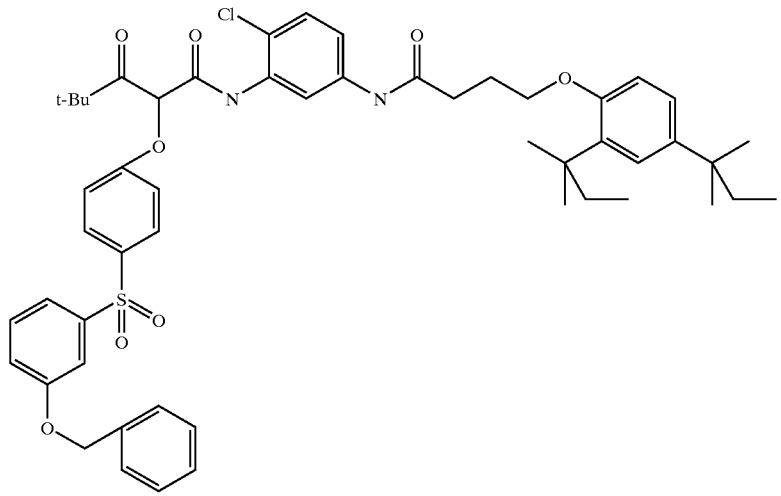

Coupler C-I  Coupler C-2

Preparation of Micro-Precipitated Dispersions

The Coupler C-1(20 g) was dissolved in a mixture of propan-1-ol (40 g) and 20% sodium hydroxide solution (5 g) at 60° C. and poured into a solution of surfactant (weight equimolar with coupler) and polyvinylpyrrolidone (10 g) in water (600 g). The resulting micellar solution was reduced to pH 6.0 by the dropwise addition of 15% propanoic acid to form the crude microprecipitated dispersion which was then dialysed through Amicon hollow fibre ultrafiltration cartridges and concentrated to a fifth of its volume.

A portion of the micellar solution was diluted to a coupler concentration of 7.0% and added to a stirred gelatin (regular Type TV bone gelatin) solution (10%) maintained at 40° C., so that a final melt concentration of 3.5% coupler, 5% gelatin was achieved.

The Coupler C-2 (16.5 mmoles) was added to a mixture of n-propanol (42 g) and 20% aqueous sodium hydroxide (17 mmoles) and stirred at 60° C. until dissolved. This was stirred into a solution of surfactant (8.25 mmoles) in demineralized water (450 g) at 20° C. and neutralised to pH6 using 15% propionic acid. The resulting translucent micellar solution was washed through an ultrafiltration cartridge (manufactured by Amicon) and then concentrated to 150 ml. A portion of the micellar solution was diluted to a coupler concentration of 7.5% and added to a stirred gelatin (Eastman type TCGIII) solution (10%) maintained at 40° C., so that a final melt concentration of 3.75% coupler, 5% gelatin was achieved.

Measurement of Liquid Dispersion Reactivity

The method used is the same as that described by Bagchi in U.S. Pat. Nos.: 4,970,139; 5,089,380 and 5,104,776, which is similar to that described in EP-A-0,674,221 (Kodak Ltd.). The method used here gives smaller differences and smaller comparative ratios in reactivity than those obtained in EP-A-0,674,221.

Results of Comparisons of Dispersants

Table 1 compares the physical data of the microprecipitated dispersions made with these different dispersants using Coupler C-1. Table 2 compares the physical data of the 15 micro-precipitated dispersions made with these different dispersants using Coupler C-2.

Tables 1 and 2 record the liquid dispersion reactivity of the coupler, the particle size and the viscosity of the dispersion after addition to the aqueous gelatin solution (as described above).

TABLE 1

Microprecipitated dispersions of Coupler C-1: Physical data

| Dispersant(s) used | Liquid dispersion reactivity | Particle size/nm | Viscosity /mPa.s |
|---|---|---|---|
| SDS + PVP (comparison: anionic dispersant) | 2500 | 22 | 110 |
| A + PVP (comparison: nonionic dispersant) | 0 | Flocculated on addition of the aqueous gelatin | Flocculated on addition of the aqueous gelatin |
| Compound 2 (invention) | 5920 | 97 | 5 |
| Compound 1 (invention) | 6100 | 41 | 3 |
| Compound 1 + PVP (comparison: addition of PVP to invention) | 2200 | 55 | 6 |

Table 1 shows several advantages afforded by the non-ionic dispersants of this invention:

1. Coupler reactivity is greatly enhanced by the dispersants of the invention, i.e. coupler reactivity is more than double that obtained with the anionic SDS system.
2. The reactivity advantages achieved with the two C12 acrylamides of this invention are substantially the same despite the difference in particle size, suggesting that the high coupler reactivity may not be dependent on particle size over the range 40–100 nm.
3. The nonionic dispersants of the invention afford a stable dispersion whereas a typical nonionic dispersant based on polyethyleneoxide such as Texofor T170 (comparison dispersant A) leads to flocculation of the dispersion on addition of aqueous gelatin.
4. The viscosity of the dispersions made with the nonionic dispersants of the present invention are less than $\frac{1}{20}$ of that produced by the dispersion made with the anionic surfactant SDS. Hence if the dispersants of the invention are used, there is much greater scope for concentration of the dispersion.
5. The combination of the PVP stabiliser with a dispersant of the invention actually produces adverse effects on the resulting dispersion: PVP lowers coupler reactivity by more than ½ and increases particle size and viscosity.

TABLE 2

Microprecipitated dispersions of Coupler C-2: Physical data

| Dispersant(s) used | Liquid dispersion reactivity | Particle size/nm | Viscosity/mPa.s |
|---|---|---|---|
| SDS + PVP (comparison: anionic dispersant) | 3683 | 299 | 86 |
| A + PVP (comparison: nonionic dispersant) | 0 | Flocculated on addition of the aqueous gelatin | Flocculated on addition of the aqueous gelatin |
| Compound 2 (invention) | 11199 | 70 | 29 |
| Compound 1 (invention) | 8987 | 86 | 24 |

Although Table 2 relates to a different coupler, Coupler C-2, it demonstrates the same trends as those discovered with Coupler C-1 and hence reinforces the advantages found in general with the compounds of this invention. These are:

1. Coupler reactivity is greatly enhanced by the dispersants of the invention. In the above examples, their associated coupler reactivity is more than twice that obtained with the system using the anionic SDS as dispersant.
2. The nonionic dispersants of the invention afford a stable dispersion of Coupler C-2 whereas a typical nonionic dispersant based on polyethyleneoxide such as Texofor T170 (comparison dispersant A) leads to flocculation of the dispersion on addition of aqueous gelatin.
3. The viscosity of the dispersions made with the nonionic dispersants of this invention are substantially lower than that produced by the dispersion made with the anionic dispersant, SDS. Hence if the dispersants of the invention are used, there is much greater scope for concentration of the dispersion.

Hence in summary of Tables 1 and 2, the dispersants of this invention lead to greatly increased coupler reactivity together with much lower dispersion viscosity; these lead correspondingly to greater efficiency of coupler usage and greater potential for concentration of the dispersion which can lead to better coating uniformity and less dryer load.

Example 7

Evaporated Dispersions

Preparation of Coupler Dispersions with Nonionic Surfactants

Invention example (coupler dispersion made using a dispersant according to the present invention)

A solution of 24.0 g of coupler C-3 (whose structure is shown below), 24.0 g of diundecyl phthalate and 72.1 g of ethyl acetate was prepared and heated to 60° C. This solution was added to a 60° C. solution of 2.0 g of compound No.2 as surfactant (structure—$C_{12}H_{25}$—S[$CH_2CHCO.NH_2$]$_{10}$-H) and 278.0 g of distilled water with mixing provided by a Silverson rotor-stator device operating at 5000 rpm. After mixing for 2 minutes, the mixture was passed through a Microfluidizer homogenizer three times at 3000 psi (20.68 MPa). To this mixture was added a 60° C. solution of 40.4 g of gelatin dissolved in 360.1 g of distilled water. The ethyl acetate in the dispersion was removed using a rotary evaporator and an equal weight of distilled water added to the dispersion. This dispersion was examined by light microscopy and found to consist of a wide distribution of 1–3 micron ($\mu$m) droplets with most of the material in droplets less than 1 micron. No evidence of flocculation was noted.

Comparison example (coupler dispersion made using a typical nonionic surfactant based on polyethyleneoxide)

The same procedure was followed as used for the invention example above with the exception that 2.0 g of BRIJ 35 (Aldrich) was substituted for Compound No. 2 as surfactant. Brij 35 is a typical alkyl polyethyleneoxide nonionic surfactant; its nominal average structure being $C_{12}H_{25}$—O[$CH_2CH_2O$]$_{23}$-H. Light microscopic examination of this dispersion shows a highly flocculated dispersion with a lattice work of flocculated droplets.

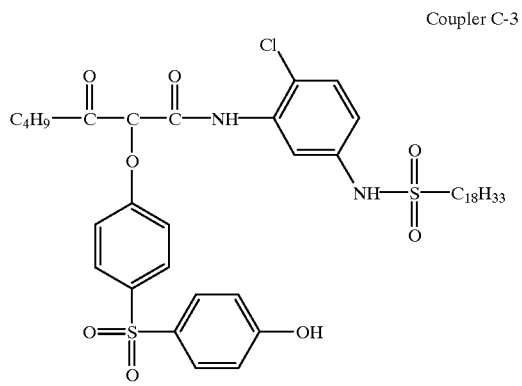

Coupler C-3

Results of Comparisons of Dispersants

The above results from microscopy show that the nonionic dispersants of this invention enable evaporated coupler dispersions to be produced with a nonionic dispersant as the sole dispersing aid whereas typical nonionic surfactants result in flocculation. As shown with the microprecipitated dispersions, coupler dispersions made with nonionic dispersants as the sole dispersing aid exhibit much lower dispersion viscosity which leads to greater efficiency of coupler usage and greater potential for concentration of the dispersion, which in turn can lead to better coating uniformity and less dryer load.

Example 8

Solid Particle Filter Dyes

The objective of this example is to compare the performance of dispersants from this invention with those in use in current practice. The procedure used to mill the materials of this invention is described in the following section together with details of the test that was used to measure the stability of the dispersion. The stability test involved holding the dispersions at 45° C. for 24 hours. The dye structure DI (see below) was selected for this test. A small but distinct photographic advantage was also seen; this is discussed in the section following the milling results.

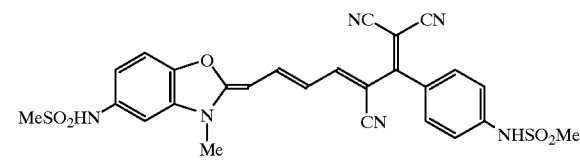

Dye D1

Ball Mill Test Procedure for Solid Particle Dye with Dispersants including Stability Test The control dispersion was prepared by combining 10 g of Dye D 1, 23.0 g of a 10% aqueous solution of dispersant Synfac 8216 (Milliken Chemical) (comparison dispersant B), 6.0 g of a 10% solution of Luviskol K-30 poly (vinylpyrrolidone) (BASF) (comparison dispersant PVP-A), 11.0 g of high-purity water and 125 ml of 1.8 mm zirconium oxide beads in an 8 oz. (227 cm) glass jar. The jar was placed on a SWECO vibratory mill for a period of time of 4–6 days. The test dispersions were prepared in the same manner except that they contained 1.5 g test dispersant and 38.5 g of high purity water in place of the Synfac 8216, Luviskol K30 and high purity water in the control dispersion.

After milling, all dye slurries were diluted to a concentration of 15% (w/w) with high purity water, and separated from the beads. Slurries were then kept at 45° C. for 24 hours. The mean particle size of both the incubated and non-incubated slurries was measured by turbidimetric light scattering, and the % change in particle size after incubation was recorded.

Comparison of Dispersants (Dye system DI)

A wide range of dispersants were tested to explore the scope of the invention using the Dye D1 as test bed. Included in the scope were materials with:

1. Single and two hydrophobic tails.
2. Tails with aryl groups, particularly aryl terminal groups.
3. Different linking groups.
4. Different monomers.
5. Different numbers of monomeric units comprising the oligomeric unit.

Table 3 shows the results obtained with these wide ranging structures and compares them with a pair of materials used together in current practice (Synfac 8216 and Luviskol K30) together with the performance of the individual constituents of the pair.

TABLE 3

Particle size, particle stability and dispersion quality for ball milled dye, D1

| Dispersant Compound No. | Initial Particle Size | Particle size 24 hr 45° C. | % growth 24 hr 45° C. |
|---|---|---|---|
| 18 | 0.1552 | 0.1603 | 3.3 |
| 4 | 0.1541 | 0.1596 | 3.6 |
| 13 | 0.1958 | 0.2028 | 3.6 |
| 5 | 0.1538 | 0.1595 | 3.7 |
| 19 | 0.1553 | 0.1611 | 3.7 |
| 7 | 0.1680 | 0.1743 | 3.8 |
| 10 | 0.1513 | 0.1570 | 3.8 |
| 11 | 0.1477 | 0.1533 | 3.8 |
| 9 | 0.1469 | 0.1527 | 3.9 |
| 2 | 0.1558 | 0.1620 | 4.0 |
| 14 | 0.1601 | 0.1668 | 4.2 |
| 20 | 0.1519 | 0.1587 | 4.5 |
| 12 | 0.1637 | 0.1719 | 5.0 |
| 21 | 0.1668 | 0.1752 | 5.0 |
| 22 | 0.1286 | 0.1354 | 5.3 |
| 23 | 0.1539 | 0.1625 | 5.6 |
| 15 | 0.1568 | 0.1682 | 7.3 |
| 24 | 0.1521 | 0.1633 | 7.4 |
| 1 | 0.1622 | 0.1756 | 8.3 |
| 17 | 0.1703 | 0.1851 | 8.7 |
| 16 | 0.1550 | 0.1783 | 15.0 |
| Comparative data | | | |
| B + PVP-A* | 0.1564 | 0.1607 | 2.8 |
| B as sole dispersant | 0.1347 | 0.1406 | 4.4 |
| PVP-A as sole dispersant | 0.2391 | | |

*Average of 9 sets

Table 3 demonstrates that the materials of this invention fulfill both the role of dispersant and stabiliser insofar as they produce fine, well-dispersed dye dispersions that do not grow by more than 15% in 24 hours at 45° C. when used as described above. However, in normal practice, this dye system usually requires the use of a combination of materials Synfac 8216+Luviskol K30) to effect a stable dispersion. Use of either of these materials alone produces unacceptable dye slurries, i.e. either dye flakes in the slurry or large particles with a low density absorbance spectrum.

Example 9

Photographic Advantages

To assess the photographic impact of the dispersants of this invention, they need to be coated and processed in a photographic element. For this purpose, a cyan monochrome format was selected which utilizes the solid particle filter dye DI as an antihalation layer between the photographic support and the cyan imaging layer. Three assemblages were compared: one in which the control dispersants Synfac 8216 and Luviskol K30 were used to disperse the DI filter dye; one in which a representative compound of the invention, namely compound No. 2 ($Cl_2H_{25}$—S—$[A]_{10}$H where A is acrylamide) was used to disperse the DI filter dye; and one in which no filter dye was incorporated at all. The latter acts as a basic control. The details of the photographic elements used in the comparison are as follows:

The control dispersion of Dye D-1 utilizing the control dispersants, Synfac 8216 (comparison dispersant B) and Luviskol K30 (comparison dispersant PVP-A), was mixed with deionised gelatin, water, and spreading aids, and then coated on a gelatin subbed polyethylene terephthalate support with Rem Jet backing in a cyan monochrome format with the following structure (element A):

Element A

Protective Overcoat Layer

Poly(dimethyl siloxane) 200-CS, 65.9 mg/m$^2$.

Poly(methyl methacrylate) beads, 5.0 mg/m$^2$.

Soluble red filter dye 1, 110.9 mg/m$^2$.

Soluble green filter dye 2, 32.3 mg/M$^2$.

Soluble green filter dye 3, 32.3 mg/M$^2$.

Soluble blue filter dye 4, 16.2 mg/m$^2$.

Gelatin, 977.4 mg/m$^2$.

Spreading aids.

Gelatin hardener.

Red Sensitized Layer

AgClBr cubic grain emulsion, 25% Br, 0.15 micron, sensitized with red dye cpd 5, 0.1808 mmole/Ag mole, supersensitizer cpd 6, 0.6327 mmole/Ag mole, 397.2 mg/r$^2$.

AgClBr cubic grain emulsion, 25% Br, 0.24 micron, sensitized with red dye cpd 5, 0.1356 mmole/Ag mole, supersensitizer cpd 6, 0.7444 mmole/Ag mole, 44.1 mg/m$^2$.

Cyan dye forming coupler (C-1), 968.8 mg/M$^2$.

Oxidized developer scavenger, cpd 7, 12.9 mg/m$^2$.

Palladium antifoggant cpd 8, 8.1 mg/m$^2$.

Gelatin, 3412 mg/m$^2$.

Spreading aids.

Anti-halation Layer

Filter dye D1 from control dispersion, 107.6 mg/m$^2$.

Deionised gelatin, 1076 mg/m$^2$.

Spreading aids.

Support

Transparent polyethylene terephthalate support with Rem Jet Backing. Rem Jet is a black-pigmented, non-gelatin layer on the back of the film base which provides anti-halation and antistatic properties.

In a corresponding manner, the test dispersion of Dye D-1, utilising the dispersant $C_{12}H_{25}$—S—$[A]_{10}$-H, wherein A=acrylamide (Compound No. 2), of the invention, was coated in an identical monochrome format (element B). Finally, the basic control monochrome system was prepared with no filter dye dispersion present in the anti-halation layer (element C).

The elements were exposed for 1/500 second by means of a 3000° K. Tungsten light source through a 0–3 neutral density step tablet, a heat-absorbing filter, and a filter designed to represent a motion picture colour negative film. After exposure, the elements were processed through Process ECP-2B with the exception that those steps specific to sound track development were omitted. The process consisted of a pre-bath (10"), water rinse (20"), colour developer (3'), stop bath (40"), first wash (40"), first fix (40"), second wash (40"), bleach (1'), third wash (40"), second fix (40"), fourth wash (1'), final rinse (10"), and then drying with hot air The ECP-2B Pre-bath consists of

| Water | 800 ml |
|---|---|
| Borax (decahydrate) | 20.0 g |
| Sodium sulfate (anhydrous) | 100.0 g |
| Sodium hydroxide | 1.0 g |
| Water to make 1 liter | |
| pH @ 26.7° C. is 9.25 +/− 0.10 | |

The ECP-2B Color Developer consists of

| Water | 800 ml |
|---|---|
| Kodak Anti-Calcium, No. 4 (40% solution of a pentasodium salt of nitrilo-tri(methylene phosphonic acid) | 1.00 ml |
| Sodium sulfite (anhydrous) | 4.35 g |
| Sodium bromide (anhydrous) | 1.72 g |
| Sodium carbonate (anhydrous) | 17.1 g |
| Kodak Colour Developing Agent, CD-2 | 2.95 g |
| Sulfuric acid (7.0 N) | 0.62 ml |
| Water to make 1 liter | |
| pH @ 26.7° C. is 10.53 +/− 0.05 | |

The ECP-2B Stop Bath consists of

| Water | 900 ml |
|---|---|
| Sulfuric acid (7.0 N) | 50 ml |
| Water to make 1 liter | |
| pH @ 26.7° C. is 0.90 | |

The ECP-2B Fixer consists of

| Water | 800 ml |
|---|---|
| Ammonium thiosulfate (58.0% solution) | 100.0 ml |
| Sodium bisulfite (anhydrous) | 13.0 g |
| Water to make 1 liter | |
| pH @ 26.7° C. is 5.00 +/− 0.15 | |

The ECP-2B Ferricyanide Bleach consists of

| Water | 900 ml |
|---|---|
| Potassium ferricyanide | 30.0 g |
| Sodium bromide (anhydrous) | 17.0 g |
| Water to make 1 liter | |
| pH @ 26.7° C. is 6.50 +/− 0.05 | |

The Final Rinse solution consists of

| Water | 900 ml |
|---|---|
| Kodak Photo-Flo 200 ™ Solution | 3.0 ml |
| Water to make 1 liter | |

Processing of the exposed elements is done with the colour developing solution adjusted to 36.7° C. The stopping, fixing, bleaching, washing, and final rinsing solution temperatures are adjusted to 26.7° C.

The optical density due to dye formation was then measured on a densitometer using filters in a densitometer appropriate to the intended use of the photographic element. Dye Density was then graphed vs. log(exposure) to form the Red, Green, and Blue D-LogE characteristic curves of the photographic elements. The D-max (maximum density), fixed upper scale contrast (FUSC), and relative speed at a density of 1.0 (SPD1.0) values are listed in Table 4. FUSC is defined as the slope of a line drawn between a point at a density of 1.0 and a point at 0.5 logE higher exposure. The relative speeds at a density of 1.0 were determined by interpolation over a 300 unit range corresponding to the exposure range generated by exposure through the 0–3 neutral density step tablet, where the relative speed at the end of the log(exposure) scale representing greatest exposure is assigned a value of 0 and the relative speed at the opposite end of the log(exposure) scale representing least exposure is assigned a value of 300.

TABLE 4

Effect of Dye D-1 Dispersants on Photographic Properties

| Element | Dye | Dispersant | D-max | FUSC | SPD1.0 |
|---|---|---|---|---|---|
| A | D-1 | B, PVP-A (control dispersants, comparison) | 3.56 | 3.70 | 109.6 |
| B | D-1 | Compound 2 (invention) | 3.60 | 3.87 | 113.5 |
| C (basic control) | No dye | No dispersant | 3.59 | 3.77 | 110.8 |

The results from Table 4 show that the system containing the dispersion of Dye D-1 made with a representative dispersant from the invention (element B) has an advantage over that containing the dispersion of Dye D-1 made with the control dispersants (element A) in that a higher D-max, FUSC, and SPD1.0 is obtained with the test dispersant (invention) than with the control dispersants. It is also clear that the control dispersants cause small losses in D-max, FUSC, and relative speed at a density of 1.0, relative to the base system containing no dye and no dispersants, whereas the test dispersant (invention) is associated with gains in FUSC and SPD1.0 and is able to match D-max.

Structures

Soluble Red Filter Dye 1

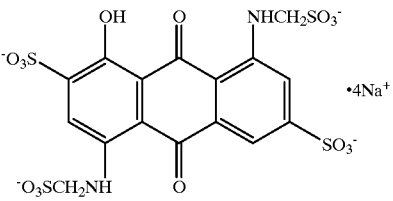

Soluble Green Filter Dye 2

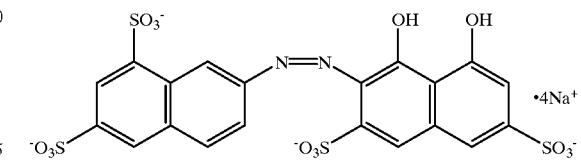

Soluble Green Filter Dye 3

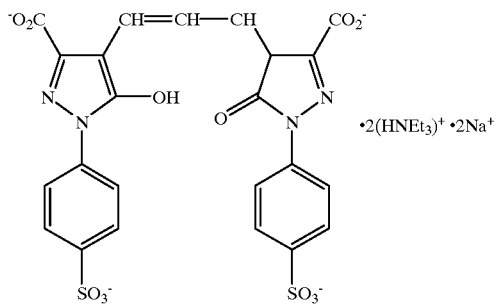

Soluble Blue Filter Dye 4

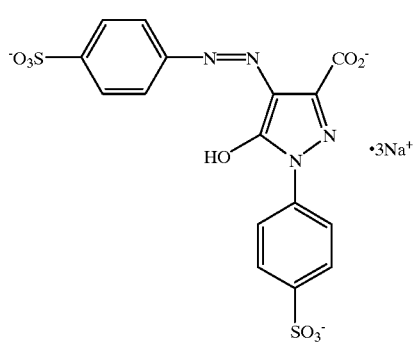

Red Sensitising Dye cpd 5

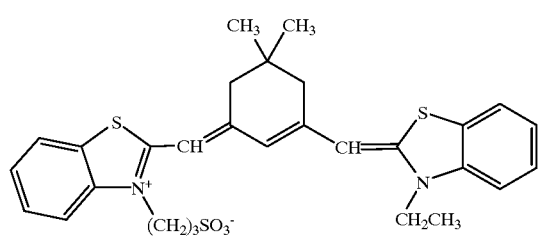

Super-sensitiser cpd 6

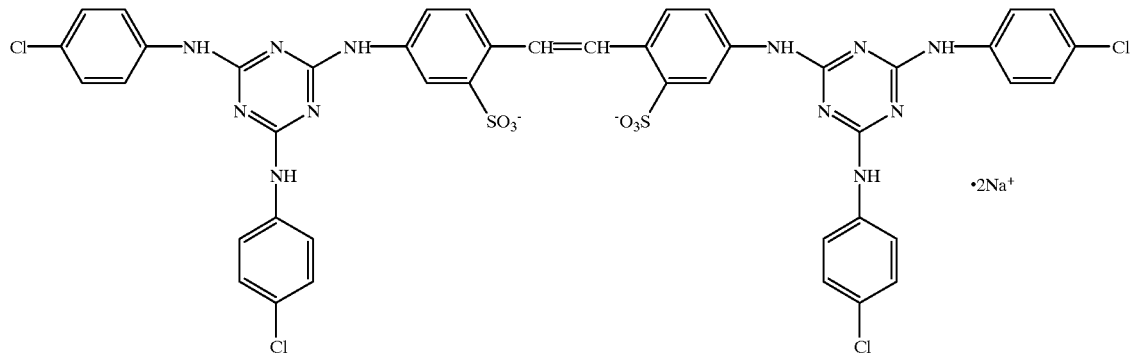

Scavenger cpd 7

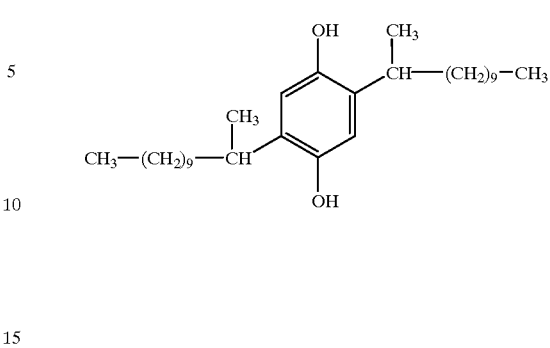

Palladium cpd 8

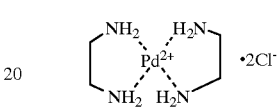

Example 10

Solid Particle Cationic Sensitising Dyes

The objective of this Example section is to compare the performance of dispersants from this invention with a range of those in use in current practice. The dispersants were assessed by two routes: first, by using a screening method which consisted of sonifying a flocculated slurry of a dye in the presence of rather high levels of the dispersant under test and appraising the response; secondly, by direct milling of the dye and dispersant using a micro media mill and appraising the quality of the resulting dispersion. These techniques are described in further detail below. The cationic dye D2 (see below) was selected for these tests.

Structure of Dye D2

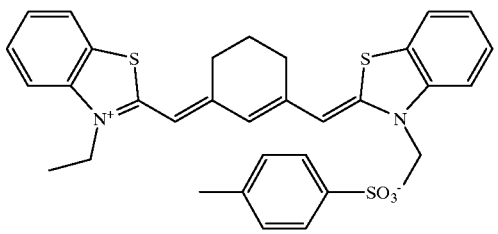

Screening test: Sonification of Flocculated Slurry

As alluded to above, cationic sensitising dyes such as D2 have proved difficult to mill satisfactorily with a wide range of dispersants, the resulting slurries either showing unacceptable thickening or simply setting up. One of the better dispersants has proved to be the polymeric stabiliser Dapral GE202 (comprison dispersant C). With this dispersant, milling can be completed with only moderate thickening and the milling media can be removed by dilution of the slurry. However, flocculation is still evident in the resulting slurry (with microscopy). Although somewhat unsatisfactory in itself, this system was used to screen a wide range of dispersants by assessing their ability to re-disperse the flocculated particles. The initial flocculated slurry used in this test is termed the "benchmark slurry".

The test process was performed by adding high levels of the test dispersant to samples of the benchmark slurry and examining the quality of the resulting dispersion by microscopy and spectroscopy. The final composition of samples in this test was 0.82% w/w Dye D2 and 4.2% w/w dispersant under test (% dispersant/% dye=5).

Milling Tests with Micro Media Mill

The milling tests utilised a micro media milling device described in U.S. Pat. No. 5,593,097. A schematic diagram of the milling region is given in FIG. 1. A bed of media contained in a 50 ml plastics centrifuge tube 1 is agitated with a stainless steel shaft 2 with horizontal projections 3. The approximate level of slurry plus beads under static conditions is indicated by the dotted line 4. The jacketed vessel (not shown) holding the tube is capable of being temperature regulated, but experiments were confined to ambient temperature by slowly flowing chill water through this jacket The media used for the milling operation was 500 $\mu$m polystyrene media (purified and sieved). The stainless steel shaft is rotated by Servodyne mixer controller, Model 50000-30, supplied by Cole Parmer Instrument Co. Typical conditions were: temperature=22° C.; rotational speed=1700 rpm; and milling time 60 minutes.

Results of Screening test: Sonification of Flocculated Slurry

The ability of various dispersants to re-suspend the benchmark slurry of Dye D2, made using the dispersant Dapral GE202 (comparison dispersant C), is summarised below in Table 5. The degree of re-dispersion was assessed by microscopy and spectroscopy. The properties desired are: fine particle size, no flocculation, no settling on ageing, and a high absorbance at the $\lambda$ max.

This screening experiment showed that many dispersants produced dispersions which were unacceptable due to one or more of the following reasons: coarse particles, flocculation, gelling or settling on ageing. These tests showed that the dispersants of the invention produced fine low viscosity re-suspended systems with no flocculation, gelling or settling. Other promising systems based on this test were the sugar-based surfactants Glucopon 225C5, Glucoside APG 225 and Glucoside APG 325 (comparison dispersants M, N and O), sodium sulphosuccinate diesters (comparison dispersants F and G), and the octylphenyl ethoxylate, Triton X-165, with the shorter ethoxylate (comparison dispersant P). Other comparison anionic and nonionic surfactants/dispersants in Table 5 showed one or more of the above problems.

In particular, it was notable that none of the comparison nonionic polymeric dispersants (polypropylene oxide/polyethylene oxide block co-polymers, polyvinyl pyrrolidones, and polyvinyl alcohol) produced an acceptable result, which is in marked contrast to the nonionic oligomeric dispersants of the present invention. Even more notable was the result that polyacrylamide homo-polymers per se do not make adequate dispersants, unlike the polyacrylamide surfactants of this invention.

TABLE 5

Ability of dispersants to resuspend the flocculated "benchmark" slurry made using Dapral GE 202

| Compound Nos | Dispersion Microscopy | | | Dispersion Spectra | |
|---|---|---|---|---|---|
| | Flocculation | | | | Absorbance |
| | size | ? | aging | $\lambda$max | $\lambda$max) |
| 1 | Fine | No | ok | 660 | 0.49 |
| 2 | Fine | No | ok | 660 | 0.53 |
| 3 | fine | No | ok | 660 | 0.48 |
| 4 | fine | No | ok | 660 | 0.46 |
| 5 | fine | No | ok | 660 | 0.43 |
| 6 | fine | No | ok | 660 | 0.51 |
| 7 | fine | No | ok | 660 | 0.48 |
| 8 | fine | No | ok | 660 | 0.49 |
| None | coarse | Yes | settles | — | — |
| D | fine | No | settles | — | — |
| E | coarse | Yes | settles | — | — |
| SDS-A | very fine | No | gels | — | — |
| F | fine | No | ok | 590 | 0.71 |
| G | fine | No | ok | 664 | 0.93 |
| H | coarse | No | ok | 656 | 0.85 |
| I | fine | Yes | gels | — | — |
| J | coarse | No | settles | — | — |
| K | coarse | No | settles | — | — |
| L | fine | No | settles | — | — |
| M | fine | No | ok | 746 | 0.37 |
| N | fine | No | ok | 756 | 0.33 |
| O | fine | No | ok | 752 | 0.33 |
| P | fine | No | ok | 756 | 0.45 |
| Q | coarse | Yes | settles | — | — |
| R | coarse | No | gelled | — | — |
| S | coarse | Yes | settles | — | — |
| T | fine | No | settles | — | — |
| U | coarse | No | settles | — | — |
| V | coarse | Yes | settles | — | — |
| W | coarse | Yes | settles | — | — |
| X | coarse | No | settles | — | — |
| Y | coarse | Yes | settles | — | — |
| Z | coarse | Yes | settles | — | — |

Results of Milling Tests with Micro Media Mill

The most promising materials from the screening investigation were tested as dispersants for dye D2 in a micro media mill (as described previously); the results are summarised below in Table 6.

TABLE 6

Ability of dispersants to disperse and stabilise cationic sensitising dye D2 in a micro media mill

| Compound No | % Concentration of Dispersant | Slurry Behaviour WD = well dispersed | Dispersion Spectra λmax | Absorbance (λmax) |
|---|---|---|---|---|
| 1 | 0.5000 | WD/low viscosity | — | — |
| 1 | 1.0000 | WD/low viscosity | — | — |
| 2 | 0.5000 | WD/low viscosity | — | — |
| 2 | 1.0000 | WD/low viscosity | 730 | 1.4 |
| 3 | 1.0000 | WD/low viscosity | — | — |
| 4 | 1.0000 | WD/low viscosity | 732 | 1.4 |
| 5 | 1.0000 | WD/low viscosity | 730 | 1.4 |
| 9 | 1.0000 | WD/low viscosity | 728 | 1.3 |
| 10 | 1.0000 | WD/low viscosity | 728 | 1.3 |
| 11 | 1.0000 | WD/low viscosity | 726 | 1.2 |
| 7 | 1.0000 | WD/low viscosity | 730 | 1.2 |
| D | 0.5000 | viscous | — | — |
| D | 1.0000 | sets up | — | — |
| SDS | 1.0000 | sets up | — | — |
| F | 1.0000 | sets up | — | — |
| G | 1.0000 | sets up | — | — |
| C | 1.0000 | viscous | — | — |
| P | 1.0000 | viscous | 728 | 1.0 |
| M | 1.0000 | sets up | 738 | 0.9 |
| O | 1.0000 | sets up | 724 | 0.9 |

On testing the selected materials, in the Micro Media Mill, it is clear that the nonionic dispersants of the invention are the only ones that produce well-dispersed, low viscosity systems. This is evidenced by the high absorbance values at X max in the spectrometer. All the other dispersants, whether nonionic (polypropylene oxide/polyethylene oxide block copolymers, Triton X-165, sugar-based Glucopon 225CS and Glucoside APG 325) or anionic (sulphosuccinate diesters, sodium docecyl sulphate, Dapral GE-202), produced systems that either are too viscous or set up; furthermore, they give inferior absorbance at λmax. One particularly important result from the screening test is that polyacrylamide materials per se (the Cyanomers) do not make good dispersants so the hydrophobic element present in this invention appears to be an essential feature. Therefore, within the range of materials selected, the dispersants of this invention are unique in their performance in these dispersant applications.

It will, of course, be understood that the present invention has been described above purely by way of example and that modifications of detail can be made within the scope of the invention.

What is claimed is:

1. A photographic material which comprises a support bearing a plurality of hydrophilic colloid layers including at least one light-sensitive silver halide emulsion layer, wherein at least one such hydrophilic colloid layer comprises a hydrophilic colloid, a hydrophobic material dispersed in the hydrophilic colloid and a dispersant, wherein the dispersant is a hydrophobically capped oligomeric acrylamide or a hydrophobically capped oligomeric pyrrolidone.

2. A photographic material according to claim 1, in which the dispersant is a compound of the general formula

R—L—T     (1)

or

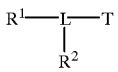

(2)

in which
  R, $R^1$ and $R^2$ are each independently selected from aliphatic hydrocarbyl, aryl-(aliphatic hydrocarbyl) and (aliphatic hydrocarbyl)-aryl groups,
  L is a sulphur atom or a linking group that contains a sulphur atom attached to the T group, and
  T is a hydrophilic oligomeric group obtained by the oligomerisation of one or more vinyl monomers having an amido function.

3. A photographic material according to claim 2 in which the dispersant is a compound of the general formula

R—S—T     (3)

R—O—OC—CH$_2$—S—T     (4)

R—NH—OC—CH$_2$—S—T     (5)

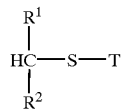

(6)

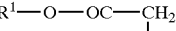
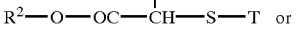 or (7)

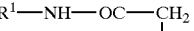
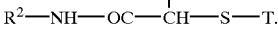

(8)

4. A photographic material according to claim 2 in which R, $R^1$ and $R^2$ are each independently selected from alkyl, alkenyl, phenyl-alkyl, phenyl-alkenyl, naphthylalkyl, naphthylalkenyl, alkylphenyl, alkenylphenyl, alkylnaphthyl and alkenylnaphthyl groups.

5. A photographic material according to claim 4 in which each of R, $R^1$ and $R^2$ contains from 8 to 21 carbon atoms.

6. A photographic material according to claim 2, in which T is obtainable by the oligomerisation of a monomer of the general formula

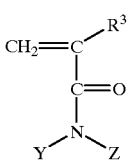

(9)

in which
  $R^3$ is H or $C_1$–$C_3$ alkyl
  Y is H, $C_1$–$C_3$ alkyl or $C_1$–$C_4$ alkyl substituted with one or more hydroxy groups, and
  Z, which may be the same as or different from Y, is H, $C_1$–$C_3$ alkyl or $C_{1-4}$ alkyl substituted with one or more hydroxyl groups, or
  Y and Z, together with the adjacent N atom, form a heterocyclic ring, or of the formula

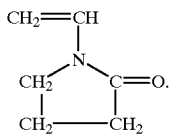

(10)

7. A photographic material according to claim 6 in which

X is H or $CH_3$

Y is H, $CH_3$, $C_2H_5$ or $C(CH_2OH)_3$, and

Z, which may be the same as or different from Y, is H, $CH_3$, $C_2H_5$ or $C(CH_2OH)_3$.

8. A photographic material according to claim 1, in which the oligomeric group contains from 2 to 100 monomeric units.

9. A photographic material according to claim 8, in which the oligomeric group contains from 3 to 50 monomeric units.

10. A photographic material according to claim 1, in which the hydrophobic material is a colour coupler, a colour coupler with associated solvent, or a solid particle dye.

11. A photographic material according to claim 10, in which the hydrophobic material is a micro-precipitated photographic coupler, a colour coupler in the form of an evaporated dispersion, a filter dye or a sensitising dye.

12. A photographic material according to claim 1, in which the hydrophilic colloid is gelatin.

* * * * *